United States Patent
Fujiwaka

(10) Patent No.: US 10,931,593 B2
(45) Date of Patent: Feb. 23, 2021

(54) MANAGEMENT NODE, MANAGEMENT SYSTEM, MANAGEMENT METHOD AND COMPUTER-READABLE RECORDING MEDIUM

(71) Applicant: NEC Corporation, Tokyo (JP)

(72) Inventor: Masaya Fujiwaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 339 days.

(21) Appl. No.: 16/088,139

(22) PCT Filed: Mar. 23, 2017

(86) PCT No.: PCT/JP2017/011607
§ 371 (c)(1),
(2) Date: Sep. 25, 2018

(87) PCT Pub. No.: WO2017/170088
PCT Pub. Date: Oct. 5, 2017

(65) Prior Publication Data
US 2020/0304420 A1   Sep. 24, 2020

(30) Foreign Application Priority Data
Mar. 30, 2016 (JP) ................. 2016-068774

(51) Int. Cl.
*H04L 12/911* (2013.01)
*H04L 12/919* (2013.01)

(52) U.S. Cl.
CPC .......... *H04L 47/783* (2013.01); *H04L 47/765* (2013.01); *H04L 47/822* (2013.01); *H04L 47/827* (2013.01)

(58) Field of Classification Search
CPC ... H04L 47/783; H04L 47/765; H04L 47/822; H04L 47/827; G06F 9/50
See application file for complete search history.

(56) References Cited

U.S. PATENT DOCUMENTS

2009/0009317 A1* 1/2009 Weaver .................. G06Q 10/06
340/517
2010/0153147 A1* 6/2010 Angell .................. G06Q 10/04
705/7.28
(Continued)

FOREIGN PATENT DOCUMENTS

JP    2001-249866 A    9/2001
JP    2011-048504 A    3/2011
(Continued)

OTHER PUBLICATIONS

International Search Report for PCT Application No. PPCT/JP2017/011607, dated Jun. 20, 2017.
(Continued)

*Primary Examiner* — Michael Won

(57) ABSTRACT

Provided a management node etc. that is possible to alleviate a delay in a time to start analyzing sensor data. The management node analyzes sensor data collected by a sensor device, and includes: an assessment unit configured to determines whether a first time period required to process the sensor data at a center node within a data center is larger than a prescribed threshold; and a determination unit configured to determines the sensor data is to be analyzed at the center node when the first time period is equal to or less than the prescribed threshold.

8 Claims, 8 Drawing Sheets

(56) References Cited

U.S. PATENT DOCUMENTS

| | | |
|---|---|---|
| 2012/0246214 A1 | 9/2012 | Ogawa et al. |
| 2013/0194928 A1* | 8/2013 | Iqbal .................. H04W 4/38 |
| | | 370/235 |
| 2016/0094476 A1* | 3/2016 | Dronen ............... H04L 47/783 |
| | | 709/226 |
| 2017/0310605 A1* | 10/2017 | Garcia ................ H04L 47/76 |
| 2017/0322861 A1* | 11/2017 | Chan ................... G06F 9/50 |
| 2018/0027703 A1* | 1/2018 | Adiletta .............. G06F 3/0673 |
| | | 361/679.48 |
| 2018/0286210 A1* | 10/2018 | Frascati-Robinson ............. |
| | | G06Q 40/08 |
| 2019/0104437 A1* | 4/2019 | Bartfai-Walcott ................. |
| | | H04L 41/0896 |

FOREIGN PATENT DOCUMENTS

| | | |
|---|---|---|
| JP | 2013-196139 A | 9/2013 |
| JP | 2014-078773 A | 5/2014 |
| WO | 2011/052102 A1 | 5/2011 |

OTHER PUBLICATIONS

English translation of Written opinion for PCT Application No. PCT/JP2017/011607.

* cited by examiner

Fig.3

| DATA SIZE | 100 (bytes) |
|---|---|
| TRANSMISSION INTERVAL | 100 (ms) |

Fig.4

| ANALYSIS PROCESSING COMPLETION TIME | 2 (sec) |
|---|---|

Fig.5

| DELAY BETWEEN EDGE AND CENTER | 200 (ms) |
|---|---|
| EDGE ANALYSIS UNIT PROCESSING TIME | 200 (ms) |
| CENTER ANALYSIS UNIT PROCESSING TIME | 200 (ms) |
| EDGE AGGREGATION UNIT PROCESSING TIME | 100 (ms) |

| DELAY BETWEEN EDGE AND CENTER | 200 (ms) |
|---|---|
| EDGE ANALYSIS UNIT PROCESSING TIME | 200 (ms) |
| CENTER ANALYSIS UNIT PROCESSING TIME | 200 (ms) |
| EDGE AGGREGATION UNIT PROCESSING TIME | 100 (ms) |
| EDGE AGGREGATION UNIT COMPRESSION TIME | 200 (ms) |

# MANAGEMENT NODE, MANAGEMENT SYSTEM, MANAGEMENT METHOD AND COMPUTER-READABLE RECORDING MEDIUM This application is a National Stage Entry of PCT/JP2017/011607 filed on Mar. 23, 2017, which claims priority from Japanese Patent Application 2016-068774 filed on Mar. 30, 2016, the contents of all of which are incorporated herein by reference, in their entirety.

TECHNICAL FIELD

The present invention relates to a management node, a management system, a management method, and a computer-readable recording medium.

BACKGROUND ART

Many different types of sensor devices have appeared in the market as the Internet of Things (IoT) techniques have become popular. Now, there are various types of sensor devices, depending on such a property as the data size transmitted each time, an interval of data transmission and reception, and compression efficiency, for example.

Recently, information processing technology called "edge computing" has appeared. Edge computing is a technique to use a computing resource, called "edge (edge node)", which is geographically proximate to a sensor device. An edge node enables highly efficient calculation processing with low delay by using physically proximate resources. By performing calculation processing by coordinating this edge node and a resource, called "center node", in a core network or the like, the processing can take advantage the merits of the edge node and center node.

PTL 1 discloses a technique related to edge computing. A technique described in PTL 1 distributes loads by statically or dynamically transitioning a function of a fire wall in a center node to an edge node.

CITATION LIST

Patent Literature

[PTL 1] Japanese Patent Application Laid-Open Publication No. 2001-249866
[PTL 2] Japanese Patent Application Laid-Open Publication No. 2014-078773
[PTL 3] Japanese Patent Application Laid-Open Publication No. 2011-048504

SUMMARY OF INVENTION

Technical Problem

However, so as to aggregate sensor data as described in PTL 1, a high-level analysis is required to determine an appropriate collecting method. For example, the aggregated sensor data are different in a range to be aggregated and a size into which the sensor data are compressed, depending on a nature of aggregated sensor data, empty capacity in the edge node, and the like. Therefore, in a case where sensor data are excessively aggregated in an edge node, for example, a time will be taken for compression or the like, thereby resulting in a delay in transferring the sensor data.

In other words, depending on a method in an edge node to aggregate sensor data, a time to start analyzing sensor data may be delayed.

In view of the above problem, an objective of the present invention is to provide a management node, a management system, a management method and program, and a management method that is possible to alleviate a delay in a time to start analyzing sensor data.

Solution to Problem

A management node according to one aspect of the present invention analyzes sensor data collected in a sensor device. The management node includes:
an assessment unit that determines whether a first time period required to process the sensor data at a center node within a data center is larger than a prescribed threshold; and
a determination unit that determines the sensor data is to be analyzed at the center node when the first time period is equal to or less than the prescribed threshold.
When the first time period is larger than the prescribed threshold, the assessment unit determines whether a second time period required to process the sensor data at an edge node positioned at a location near the sensor device is larger than the prescribed threshold, and
when the second time period is equal to or less than the prescribed threshold, the determination unit determines that the sensor data is to be analyzed at the edge node.

A management system according to one aspect of the present invention analyzes sensor data collected in a sensor device. The management system includes:
assessment means for determining whether a first time period required to process the sensor data at a center node within a data center is larger than a prescribed threshold; and
determination means for determining the sensor data is to be analyzed at the center node when the first time period is equal to or less than the prescribed threshold.
When the first time period is larger than the prescribed threshold, the assessment means determines whether a second time period required to process the sensor data at an edge node positioned at a location near the sensor device is larger than the prescribed threshold, and
when the second time period is equal to or less than the prescribed threshold, the determination means determines that the sensor data is to be analyzed at the edge node.

A management method according to one aspect of the present invention is a method for analyzing sensor data collected in a sensor device. The management method includes:
a step for determining whether a first time period required to process the sensor data at a center node within a data center is larger than a prescribed threshold; and
a step for determining the sensor data is to be analyzed at the center node when the first time period is equal to or less than the prescribed threshold,
a step for determining whether a second time period required to process the sensor data at an edge node positioned at a location near the sensor device is larger than the prescribed threshold when the first time period is larger than the prescribed threshold, and
a step for determining that the sensor data is to be analyzed at the edge node when the second time period is equal to or less than the prescribed threshold.

Advantageous Effects of Invention

A management node, a management system, a management method, and a program according to an embodiment of the present invention is possible to alleviate a delay in a time to start analyzing sensor data.

BRIEF DESCRIPTION OF DRAWINGS

FIG. 3 is a configuration example of information of a sensor device according to the first example embodiment of the present invention.

FIG. 4 is a configuration example of a service performance requirement of according to the first example embodiment of the present invention.

FIG. 5 is an example of a throughput with respect to an aggregated number according to the first example embodiment of the present invention.

EXAMPLE EMBODIMENT

Figure 1:
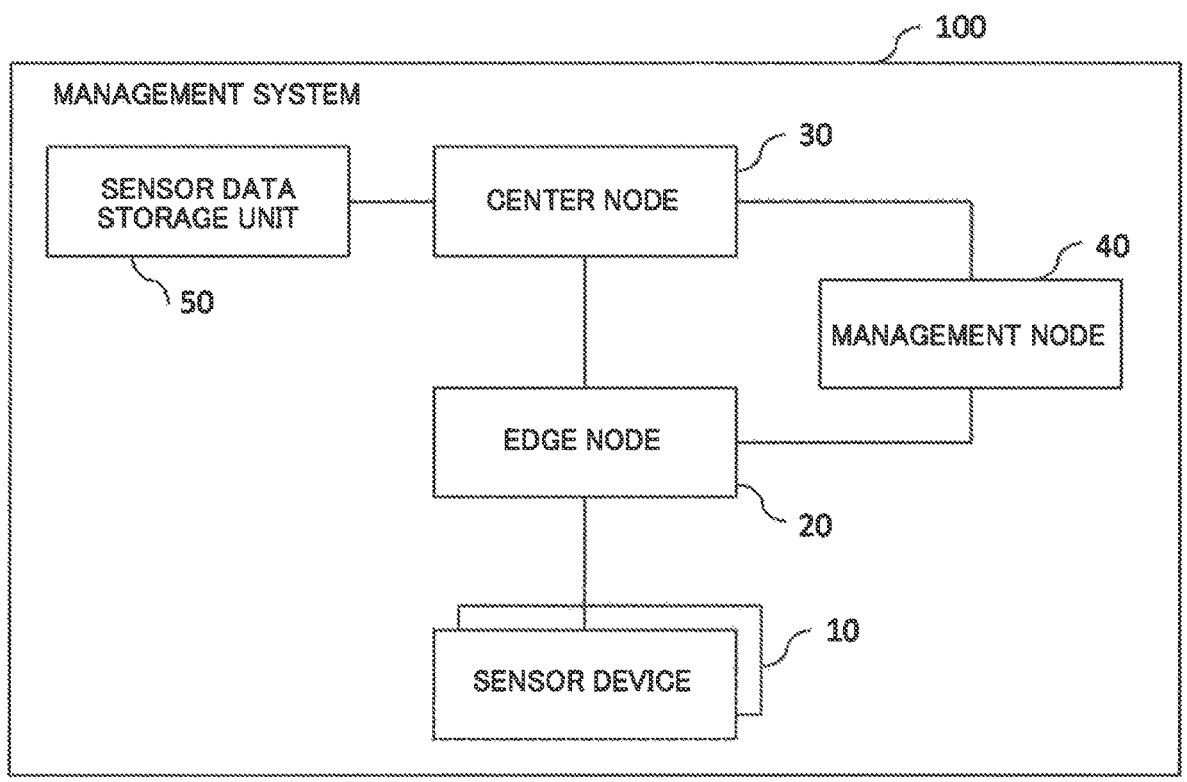
FIG. 1 is a configuration example of a management system 100 according to a first example embodiment of the present invention.

Some example embodiments and examples of the present invention are explained below, with reference to the drawings. Each example embodiment and example is illustrative, and not limiting the present invention. Note that reference numerals of drawings assigned to elements in this overview are exemplary purposes to facilitate understanding, and the description of this overview is not intended for any limitation.

First Example Embodiment

[Explanation of Configuration]

A first example embodiment of the present invention is explained in detail with reference to the drawings.

FIG. 1 is a configuration example of a management system 100 according to a first example embodiment of the present invention.

The management system 100 according to the first example embodiment of the present invention includes a sensor device 10, an edge node 20, a center node 30, a management node 40, and a sensor data storage unit 50.

Note that solid lines connecting components 10 to 50 in FIG. 1 represent either logical communications or callable relationships, and implementation of the components 10 to 50 in the present invention are not limited to any configuration or network connected in this form.

The sensor device 10 is a device to generate sensor data of a target to be analyzed. The sensor device 10 has a function of transmitting generated sensor data to another device.

The edge node 20 is a computing resource geographically proximate to a sensor device. An edge node is, for example, a node positioned in a base station in a carrier network.

The edge node 20 acquires sensor data from the sensor device 10, for example.

When the management node 40 determines that the sensor data are to be analyzed in the edge node 20, the edge node 20 analyzes the acquired sensor data. When the management node 40 determines that the sensor data are not to be analyzed in the edge node 20, the edge node 20 aggregates the acquired sensor data. The edge node 20 transmits the aggregated sensor data to the center node 30.

The center node 30 is a computer resource existing in a core network, for example. A center node is a node positioned within a core network, for example.

The center node 30 receives sensor data from the edge node 20. When the management node 40 determines that the sensor data are to be analyzed in the center node 30, the center node 30 analyzes the acquired sensor data. The center node 30 stores the analysis result in the sensor data storage unit 50.

The management node 40 acquires sensor data from the edge node 20, for example. The management node 40 is not limited to acquire sensor data from the edge node 20, but may also acquire sensor data from the center node 30 or the sensor device 10. The management node 40 performs sampling directed to the acquired sensor data. The management node 40 may perform sampling by acquiring sensor data from the edge node 20, or by acquiring sensor data from the center node 30 or the sensor device 10, for example.

The management node 40 analyzes a property of the sensor data, based on the acquired sensor data.

The management node 40 determines a number of sensor data to be aggregated (aggregated number) for sensor data analysis, based on the property of the sensor data, a basic performance of a system, and a service performance requirement. The management node 40 transmits the determined aggregated number to the edge node 20, for example.

Figure 2:
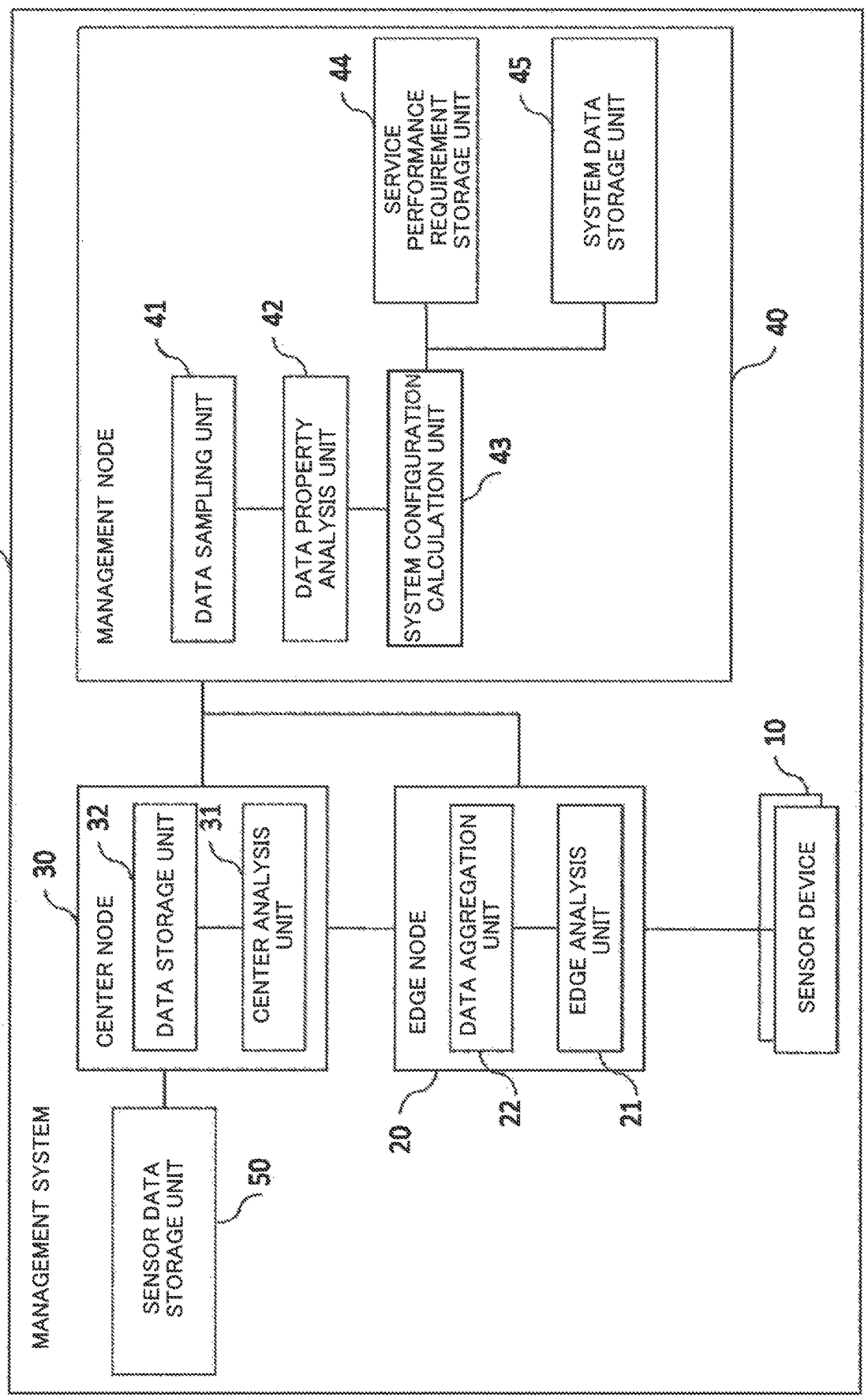
FIG. 2 is a detailed configuration example of the management system 100 according to the first example embodiment of the present invention.

FIG. 2 is a more detailed configuration example of the management system 100 according to the first example embodiment of the present invention.

The edge node 20 includes an edge analysis unit 21 and a data aggregation unit 22.

The edge analysis unit 21 acquires sensor data from the sensor device 10. When the management node 40 determines that the sensor data are to be analyzed in the edge node 20, the edge analysis unit 21 analyzes the acquired sensor data. When the management node 40 determines that the sensor data are not to be analyzed in the edge node 20, the edge analysis unit 21 transfers the acquired sensor data to the data aggregation unit 22.

Before transmitting, to the center node 30, the sensor data acquired from the edge analysis unit 21, the data aggregation unit 22 aggregates the sensor data into the aggregated number determined by the management node 40.

The center node 30 includes a center analysis unit 31 and a data storage unit 32.

The center analysis unit 31 receives sensor data from the edge node 20. When the management node 40 determines that the sensor data are to be analyzed in the center node 30, the center analysis unit 31 analyzes the acquired sensor data. The center analysis unit 31 transmits the analysis result to the result data storage unit 32.

The data storage unit 32 stores the analysis result of the sensor data acquired from the center analysis unit 31, in the sensor data storage unit 50.

The management node 40 includes a data sampling unit 41, a data property analysis unit 42, a system configuration calculation unit 43, a service performance requirement storage unit 44, and a system data storage unit 45.

The data sampling unit 41 acquires sensor data from the edge node 20, for example. The data sampling unit 41 is not limited to acquire sensor data from the edge node 20, but may also acquire sensor data from the center node 30 or the sensor device 10. For example, the data sampling unit 41 acquires a certain amount of sensor data, and transfers the acquired sensor data to the data property analysis unit 42. For example, the data sampling unit 41 may transfer the sensor data acquired in advance, to the data property analysis unit 42.

The data property analysis unit 42 receives sensor data from the data sampling unit 41. The data property analysis unit 42 analyzes the received sensor data. The data property analysis unit 42 analyzes a property of the sensor data, for example. Examples of a property of sensor data include a data size, a data transmission interval, and a compression efficiency of sensor data. The data property analysis unit 42 may acquire information such as a data size and a data transmission interval, from information on a catalogue of a sensor device, for example. The data property analysis unit 42 transmits an analysis result of the sensor data, to the system configuration calculation unit 43.

FIG. 3 is a drawing illustrating an exemplary property of the sensor device 10. The data property analysis unit 42 analyzes a property of the sensor device 10 as illustrated in FIG. 3, based on the sensor data acquired by the data sampling unit 41. As illustrated in FIG. 3, the data property analysis unit 42 analyzes "a data size for a unit of the sensor data to be 100 bytes, and the data to be transmitted with an interval of 100 [ms]", as a property of the sensor device 10, for example.

The system configuration calculation unit 43 receives an analysis result of the sampled sensor data, from the data property analysis unit 42. The system configuration calculation unit 43 acquires, from the service performance requirement storage unit 44, a service performance requirement of a service managed by the management system 100. The system configuration calculation unit 43 acquires, from the system data storage unit 45, a system basic performance of a service managed by the management system 100.

FIG. 4 is a drawing illustrating an example of a service performance requirement acquired by the system configuration calculation unit 43. The system configuration calculation unit 43 acquires, for example, a requirement indicating "the analysis processing is required to be completed within 2 [sec]", as a service performance requirement.

The system configuration calculation unit 43 determines a system configuration suitable for the management system 100, from information acquired from the data property analysis unit 42, the service performance requirement storage unit 44, and the system data storage unit 45.

The system configuration calculation unit 43 determines a node to execute analysis processing of the sensor data, for example. The system configuration calculation unit 43 determines whether the service performance requirement is satisfied or not in a case where the sensor data are analyzed in the center analysis unit 31 without being aggregated in the data aggregation unit 22. When the service performance requirement is satisfied in the case where the sensor data are analyzed in the center analysis unit 31 without being aggregated in the data aggregation unit 22, the system configuration calculation unit 43 determines to perform analysis processing of the sensor data in the center node 30.

In a case where analysis processing of sensor data is performed in the center node 30, the system configuration calculation unit 43 determines a parameter (aggregated number) used for aggregating the sensor data in the data aggregation unit 22. The system configuration calculation unit 43 determines a parameter (aggregated number) using values of an analysis completion time, a throughput, and a resource usage amount, for example. The system configuration calculation unit 43 may make the determination by using any one or more of the values of the analysis completion time, the throughput, and the resource usage amount. For example, when using a size of throughput to determine a parameter (aggregated number), the system configuration calculation unit 43 selects an aggregated number of data for the data aggregation unit 22 that maximizes the throughput within a range in which the service performance requirement is satisfied. For example, the aggregated number of data for the data aggregation unit 22 that maximizes the throughput within a range in which the analysis processing completion time is equal to or less than a certain value, is selected. For example, the system configuration calculation unit 43 may determine a value of a parameter (aggregated number) by using an integrated index calculated by adding an adequate value to each value, when using a plurality of evaluation axes.

Figure 6:
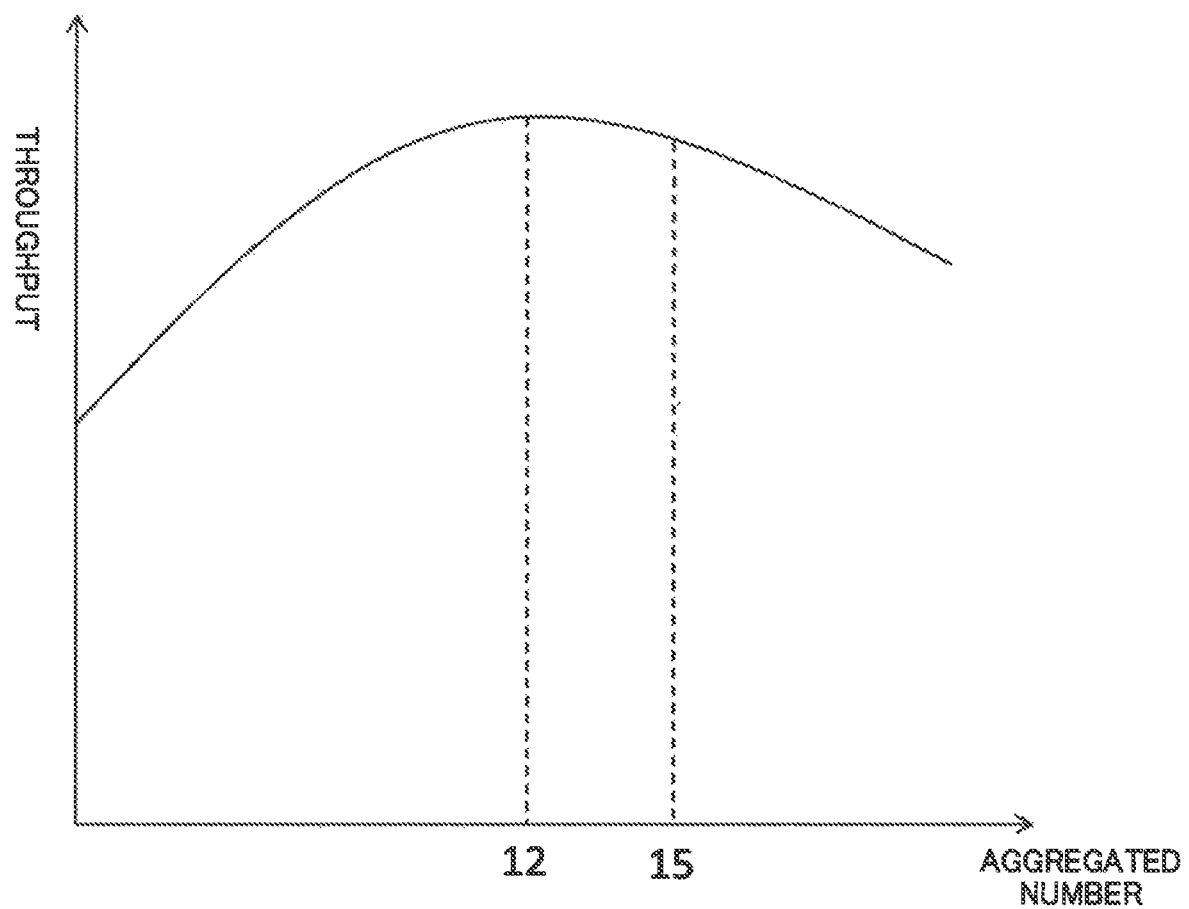
FIG. 6 is a configuration example of information in a system database according to the first example embodiment of the present invention.

FIG. 6 is a drawing illustrating a relationship between a number of the sensor data to be aggregated (aggregated number) and a throughput. As illustrated in FIG. 6, the throughput takes a maximum value when the aggregated number of the sensor data is 12. A relationship between an aggregated number and a throughput as illustrated in FIG. 6 may be acquired in advance, or may be acquired in operation.

When the service performance requirement is not satisfied in a case where the sensor data are analyzed in the center node 30 without being aggregated in the data aggregation unit 22, the system configuration calculation unit 43 determines whether the service performance requirement is satisfied in a case where analysis processing on the sensor data is performed in the edge analysis unit 21 without aggregating the sensor data in the data aggregation unit 22.

When the service performance requirement is satisfied in a case where analysis processing of the sensor data is performed in the edge analysis unit 21 without aggregating the sensor data in the data aggregation unit 22, the system configuration calculation unit 43 determines to perform analysis processing of sensor data in the edge node 20.

When performing analysis processing of sensor data in the edge node 20, the system configuration calculation unit 43 determines a parameter (aggregated number) used in aggregation of the sensor data in the data aggregation unit 22, just as when performing analysis processing of sensor data in the center node 30. Aggregation of sensor data is performed after analysis processing of the sensor data. Therefore, there will not be such a case in which a service requirement is not satisfied due to the aggregated number.

When performing analysis processing of sensor data in the edge analysis unit 21, and a service requirement is not satisfied, the system configuration calculation unit 43 determines that there is no system configuration that satisfies the service performance requirement, and terminates the processing abnormally.

The system configuration calculation unit 43 determines a parameter (aggregated number) used in aggregation of sensor data in the data aggregation unit 22, from information acquired from the data property analysis unit 42, the service performance requirement storage unit 44, and the system data storage unit 45. A parameter (aggregation number) used in aggregation of sensor data may include an aggregated number of sensor data, whether sensor data are compressed or not, and a compression algorithm, for example.

The system configuration calculation unit 43 transmits a result of the determination to the edge node 20.

The service performance requirement storage unit 44 retains information on a condition required for a service in the management system 100. The service performance requirement storage unit 44 retains, for example, an analysis processing completion time, a throughput, a resource amount usable in the edge node 20, and a resource amount usable in the center node 30. The service performance requirement storage unit 44 retains, for example, at least one of an analysis processing completion time, a throughput, a resource amount usable in the edge node 20, and a resource amount usable in the center node 30. In the following explanation, for simplifying purposes, the service performance requirement storage unit 44 is assumed to retain an analysis processing completion time. An analysis processing completion time is a time period from reception of sensor data in the edge node 20 and till completion of analysis processing of the sensor data.

The system data storage unit 45 retains a system basic performance in the management system 100. The system data storage unit 45, for example, retains a processing time in the edge analysis unit 21, the data aggregation unit 22, and the center analysis unit 31, network delay information between the center node 30 and the edge node 20, a resource capacity in each node, and a relationship between an aggregated number of sensor data and a throughput. The system data storage unit 45 is a database, for example.

FIG. 5 is a drawing illustrating an example of a system basic performance retained by the system data storage unit 45. The system data storage unit 45, for example, stores 200 [ms] as "a delay between the edge node 20 and the center node 30". In addition, the system data storage unit 45 stores 200 [ms] as a processing time when executed in an analysis unit in the edge node 20, and 200 [ms] as a processing time when executed in an analysis unit in the center node 30, as "a time required for analysis processing". In addition, the system data storage unit 45 stores 100 [ms] as "an edge aggregation unit processing time".

The system configuration calculation unit 43 calculates a system configuration and a parameter (aggregated number) that maximize the throughput, while satisfying a service performance requirement, using a service performance requirement acquired by the system configuration calculation unit 43 illustrated in FIG. 4, a relationship between an aggregated number of sensor data and a throughput illustrated in FIG. 6, and a system basic performance illustrated in FIG. 5.

For example, first, the system configuration calculation unit 43 confirms whether the service performance requirement can be satisfied in a case where data analysis processing is performed in a center node without being aggregated in the data aggregation unit 22. The system configuration calculation unit 43 calculates a time required for the analysis processing, using the service performance requirement acquired by the system configuration calculation unit 43 illustrated in FIG. 4 and the system basic performance illustrated in FIG. 5, for example. For example, the system configuration calculation unit 43 may calculate 400 [ms] by adding the processing time at the center analysis unit, which is 200 [ms], to the delay between the edge node and the center node, which is 200 [ms], as the time required for the analysis processing, and confirms that the calculated analysis processing time satisfies the service performance requirement.

Next, the system configuration calculation unit 43 determines the maximum aggregated number that can satisfy the service performance requirement. For example, the system configuration calculation unit 43 calculates the maximum analysis processing time to be taken for analysis processing, to be 2 [sec], under an assumption that the aggregated number is 15, in the follow manner:

"a delay between the edge node and the center node (200 [ms])+a center analysis unit processing time (200 [ms])+a transmission interval (100 [ms])×15+an edge aggregation unit processing time (100 [ms])=2 [sec]".

As a result, the system configuration calculation unit 43 determines that 15 is the maximum aggregated number.

The sensor data are buffered until the data aggregation unit 22 accumulates 15 sensor data. Therefore, the processing time completion time for the first sensor data to reach the buffer will be the maximum processing completion time, which is 2 [sec]. In this way, the system configuration calculation unit 43 confirms that, when the aggregated number is equal to or less than 15, the service performance requirement can be satisfied.

Thereafter, the system configuration calculation unit 43 determines an aggregated number, based on a relationship between an aggregated number of sensor data and a throughput. For example, the system configuration calculation unit 43 determines a value from the aggregated number of equal to 15 or less that maximizes the throughput, by referring to the relationship between the aggregated number of the sensor data and the throughput illustrated in FIG. 5, and outputs "12" as the value.

In the above-described first example embodiment of the present invention, analysis processing of sensor data may be performed in the edge analysis unit 21, or in the center analysis unit 31. Analysis processing of sensor data may be performed in coordination between the edge analysis unit 21 and the center analysis unit 31, for example. When performing analysis processing in the edge analysis unit 21, the edge node 20 may be arranged to aggregate a plurality of processed sensor data and to transmit the result to the center node 30. In the following explanation, for simplifying purposes, analysis processing of sensor data is assumed to be processed in either the edge analysis unit 21 or the center analysis unit 31.

[Explanation of Operations]

Figure 7:
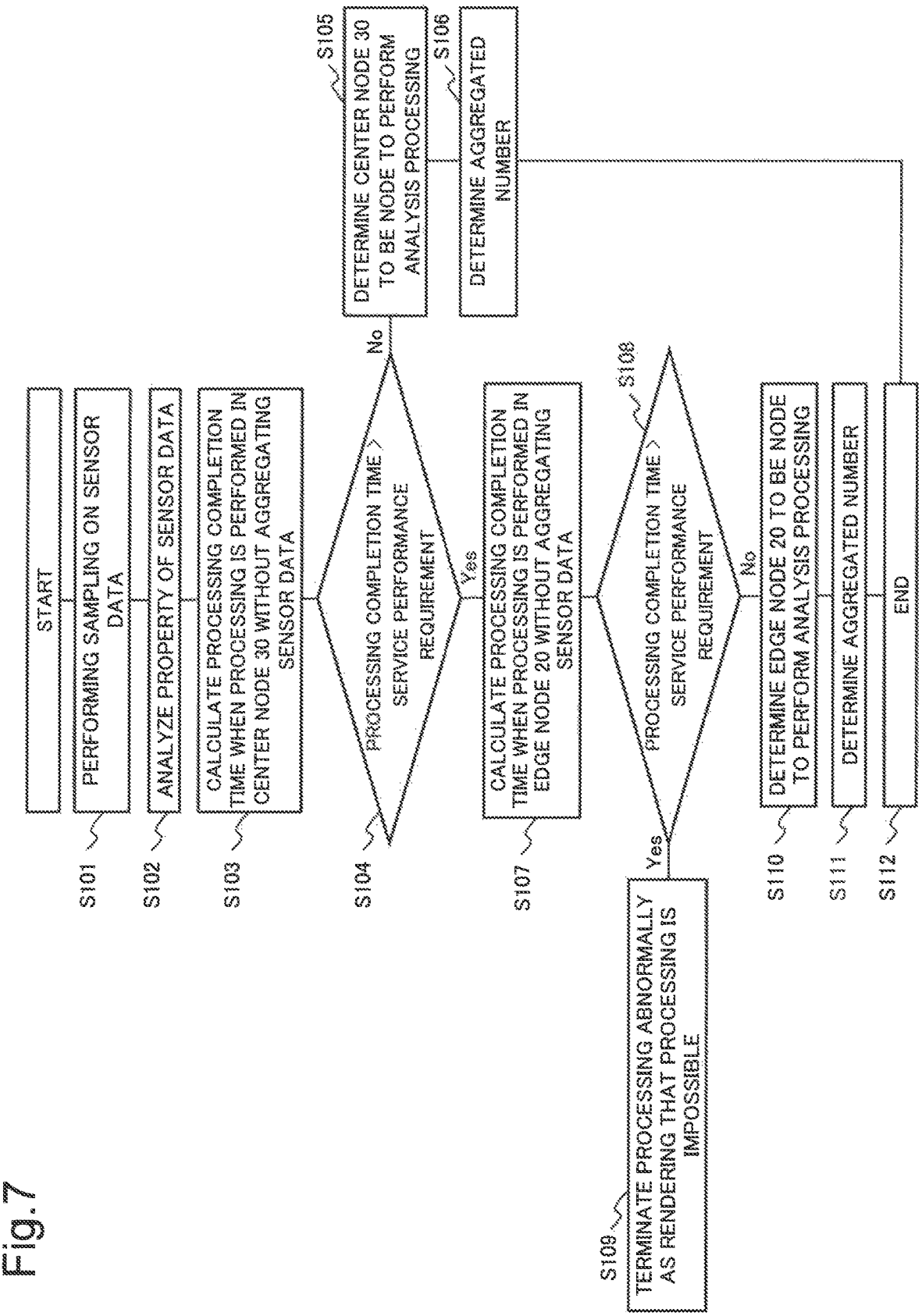
FIG. 7 is a flowchart illustrating an operation example of a management system according to the first example embodiment of the present invention.

FIG. 7 is a flowchart illustrating an operation example of the management node 40 according to the first example embodiment of the present invention.

First, the management node 40 collects sensor data through the data sampling unit (S101), and analyzes a property of the sensor data in the data property analysis unit (S102).

The management node 40 calculates a processing completion time in a case where analysis processing is performed in the center node without the sensor data being aggregated, on the basis of the analyzed property information, analysis or aggregation time stored in the system database, and delay information between the edge node and the center node (S103).

The management node 40 determines whether the calculated processing completion time is larger than the service performance requirement (the processing completion time to be satisfied) (S104).

When the calculated processing completion time is equal to or less than the service performance requirement (the processing completion time to be satisfied) (S104: NO), the management node 40 sets the center node to be a node to perform analysis processing (S105), and calculates an aggregated number that maximizes a throughput within a range in which the service performance requirement is satisfied (S106).

On the other hand, when the calculated processing completion time is larger than the service performance requirement (the processing completion time to be satisfied) (S104: YES), the management node 40 calculates a processing completion time in a case where analysis processing is performed in an edge node without the sensor data being aggregated (S107).

The management node 40 determines whether the calculated processing completion time is larger than the service performance requirement (the processing completion time to be satisfied) (S108).

When the calculated processing completion time is larger than the service performance requirement (S108: YES), the management node 40 terminates the processing abnormally, rendering that the analysis processing is impossible (S109).

On the other hand, when the calculated processing completion time is equal to or less than the service performance requirement (S108: NO), the management node 40 sets an edge node to be a node to perform analysis processing (S110), and determines an aggregated number that maximizes a throughput (S111).

As described above, the management system according to the first example embodiment of the present invention can calculate a system configuration and a parameter (aggregated number) that satisfy the service performance requirement and that maximize the throughput.

Second Example Embodiment

A second example embodiment of the invention of the present application is explained in detail with reference to the drawings. Note that a technique of the second example embodiment can be applied to any of the first example embodiment and the later-described example embodiment.

A configuration example of a communication system according to the second example embodiment is similar to the configuration example of the management system according to the first example embodiment illustrated in FIG. 1, and therefore no detailed explanation is made in the following.

According to the second example embodiment of the present invention, so as to determine an optimal value of a parameter (aggregated number) of the data aggregation unit, a network usage amount between the edge node 20 and the center node 30 is used, instead of the throughput value in the first example embodiment.

When aggregating sensor data, the management system according to the second example embodiment further compresses the sensor data, thereby reducing the network usage amount between the edge node 20 and the center node 30.

Figures 8, 9:
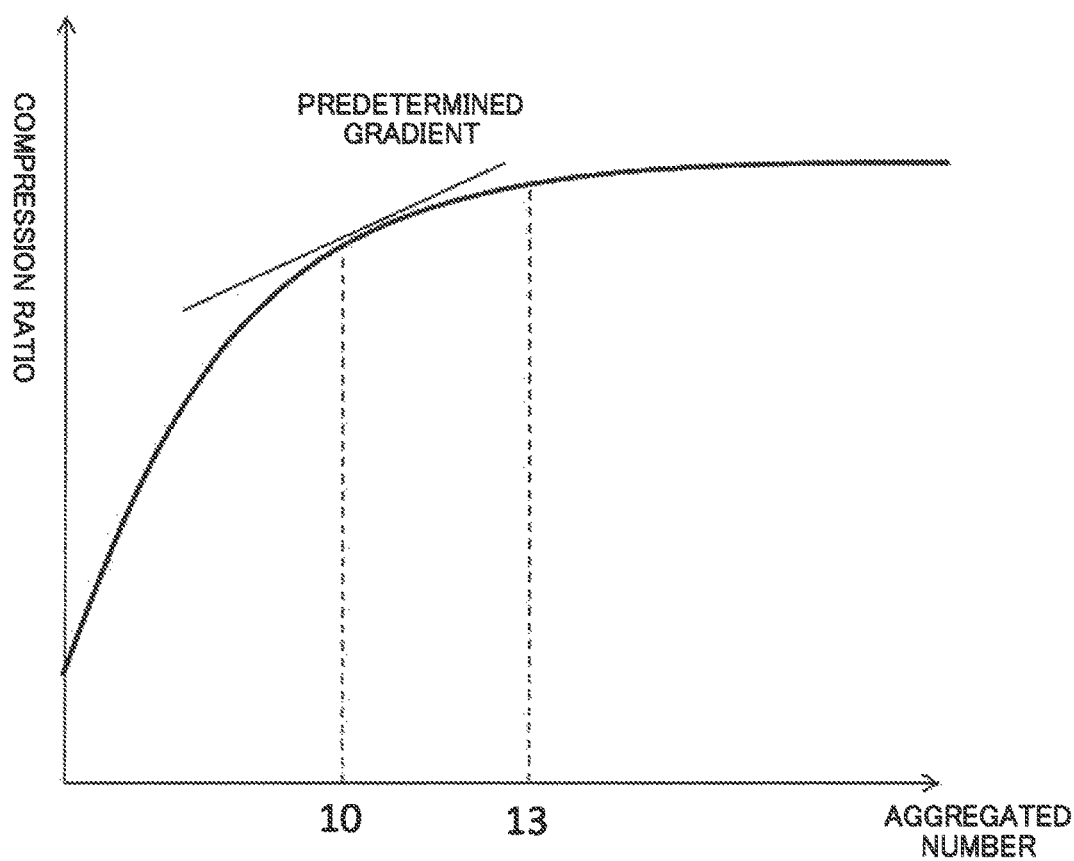
FIG. 8 is an example of a throughput with respect to an aggregated number according to a second example embodiment of the present invention.
FIG. 9 is a configuration example of information in a system database according to the second example embodiment of the present invention.

FIG. 8 is a drawing illustrating a relationship between an aggregated number of sensor data and a compression ratio. Note that the relationship between the aggregated number and the compression ratio is calculated in the data property analysis unit 42. Note that, calculation of the relationship between the aggregated number of the sensor data and the compression ratio needs to also take into account a time required for the compression.

FIG. 9 is a drawing illustrating an exemplary system basic performance retained in the system data storage unit 45 according to the second example embodiment. An edge aggregation unit compression time is stored therein, in addition to the system basic performance according to the first example embodiment illustrated in FIG. 5. For example, the system data storage unit 45 stores 200 [ms], as the edge aggregation unit compression time.

The system configuration calculation unit 43 calculates a system configuration and a parameter (aggregated number) that satisfy the service performance requirement and that reduce the network usage amount, by using the service performance requirement acquired by the system configuration calculation unit 43 illustrated in FIG. 4, the relationship between the aggregated number of the sensor data and the compression ratio illustrated in FIG. 8, and the system basic performance illustrated in FIG. 9.

For example, first, instead of aggregating data in the data aggregation unit 22, the system configuration calculation unit 43 confirms whether the service performance requirement can be satisfied in a case where analysis processing is performed in a center node. The system configuration calculation unit 43 calculates a time required for the analysis processing, using the service performance requirement acquired by the system configuration calculation unit 43 illustrated in FIG. 4 and the system basic performance illustrated in FIG. 9, for example. For example, the system configuration calculation unit 43 may calculate 400 [ms] by adding the center analysis unit processing time, which is 200 [ms], to the delay between the edge node and the center node, which is 200 [ms], as the time required for the analysis processing, and confirms that the calculated analysis processing time satisfies the service performance requirement.

Next, the system configuration calculation unit 43 calculates the maximum aggregated number that can satisfy the service performance requirement in a case where compression is performed.

For example, the system configuration calculation unit 43 calculates the maximum analysis processing time to be taken for analysis processing, to be 2 [sec], under an assumption that the aggregated number is 13, in the follow manner:

"a delay between the edge node and the center node (200 [ms])+a center analysis unit processing time (200 [ms])+a transmission interval (100 [ms])×13+an edge aggregation unit processing time (100 [ms])+an edge aggregation unit compression time (200 [ms])=2 [sec]".

As a result, the system configuration calculation unit 43 determines that 13 is the maximum aggregated number.

The sensor data are buffered until the data aggregation unit 22 accumulates 13 sensor data. Therefore, the processing time completion time for the first sensor data to reach the buffer will be the maximum processing time completion time, which is 2 [sec]. In this way, the system configuration calculation unit 43 confirms that, when the aggregated number is equal to or less than 13, the service performance requirement can be satisfied.

Thereafter, the system configuration calculation unit 43 determines an aggregated number, based on a relationship between an aggregated number of sensor data and a compression ratio. For example, the system configuration calculation unit 43 determines, to be the aggregated number, a portion at which a gradient first becomes a certain value or less when the aggregated number is increased gradually from zero (0), by referring to the relationship between the aggregated number of the sensor data and the throughput illustrated in FIG. 8. For example, in FIG. 8, the portion at which the gradient first becomes the certain value or less is the aggregated number of 10. Note that, as illustrated in FIG. 8, the compression ratio has such a tendency of stop changing greatly, as the aggregated number is increased. This is why the criteria of aggregating a portion at which the gradient first becomes a certain value or less is adopted. However, an aggregated number that yields the maximum compression ratio may be selected.

As described above, the management system according to the second example embodiment of the present invention can calculate a system configuration and a parameter (aggregated number) that satisfy the service performance requirement and that reduce the network usage amount.

Third Example Embodiment

A third example embodiment of the invention of the present invention is explained in detail with reference to the drawings. Note that a technique of the third example embodiment can be applied to any of the first example embodiment and the second example embodiment.

Figure 10:
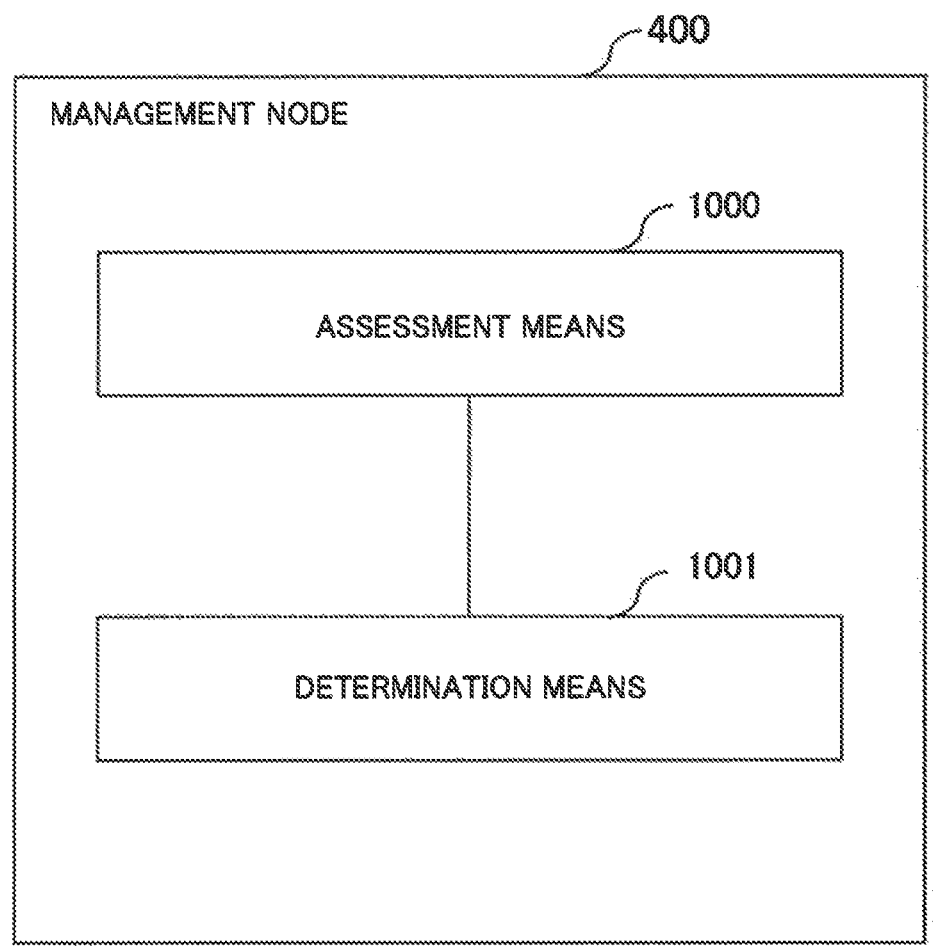
FIG. 10 is a configuration example of a management system 100 according to a third example embodiment of the present invention.

FIG. 10 is a configuration example of a management node 400 according to the third example embodiment of the present invention.

The management node 400 according to a first example embodiment of the present invention includes an assessment means and a determination means. The management node 400 is an analysis system that analyzes the sensor data acquired from the sensor device.

The assessment means 1000 of the management node 400 determines whether a first time period required to process sensor data at a center node within a core network is larger than a prescribed threshold. The first time period is a time period for completing processing the sensor data in a case where the sensor data is processed in the center node 30 without being aggregated, for example. The prescribed threshold is determined, based on the service performance requirement, for example.

When the first time period is larger than the prescribed threshold, the assessment means 1000 determines whether a second time period required to process the sensor data at an edge node is larger than the prescribed threshold.

When the assessment means 1000 has determined that the first time period is equal to or less than the prescribed threshold, the determination means 1001 determines that the sensor data is to be analyzed at the center node.

In addition, when the second time period is equal to or less than the prescribed threshold, the determination means 1001 determines that the sensor data is to be analyzed at an edge node.

Figure 11:
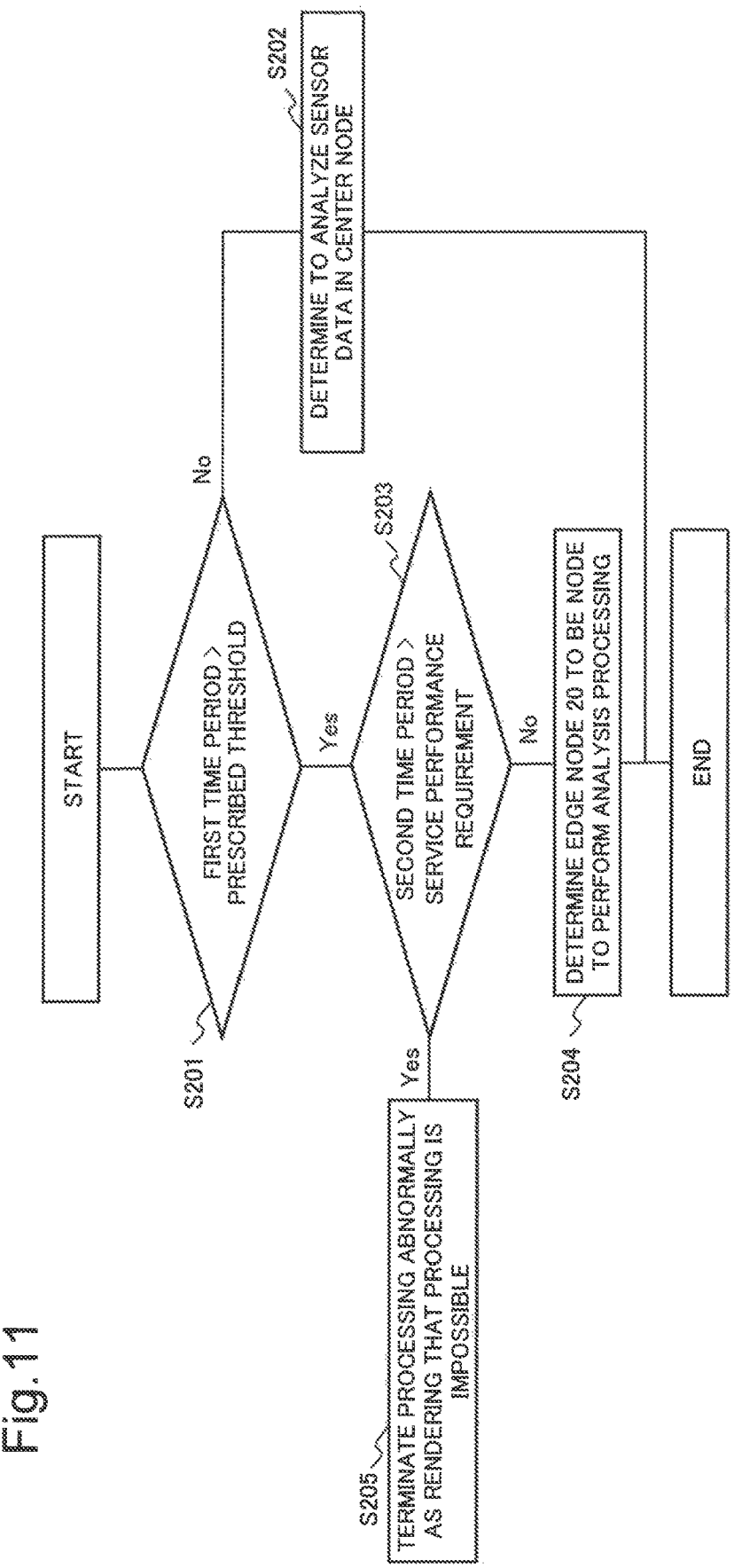
FIG. 11 is a flowchart illustrating an operation example of the management system 100 according to the third example embodiment of the present invention.

FIG. 11 is a flowchart illustrating an operation example of the management system 100 according to the third example embodiment of the present invention.

The assessment means 1000 of the management system 100 determines whether a first time period required to process sensor data at a center node in a core network is larger than a prescribed threshold (S201).

When the first time period is equal to or less than the prescribed threshold (S201: NO), the determination means 1001 determines that the sensor data is to be analyzed at the center node (S202).

On the other hand, when the first time period is larger than the prescribed threshold (S201: YES), the assessment means 1000 determines whether a second time period required to process the sensor data at an edge node is larger than the prescribed threshold (S203).

When the second time period is equal to or less than the prescribed threshold (S203: NO), the determination means 1001 determines that the sensor data is to be analyzed at the edge node (S204).

On the other hand, when the second time period is larger than the prescribed threshold (S203: YES), the determination means 1001 terminates the processing abnormally, rendering that the analysis processing is impossible (S205).

The management system according to the third example embodiment of the present invention can determine a device (an edge node or a center node) to analyze sensor data, which satisfies the service performance requirement.

So far, some example embodiments of the present invention have been explained. However, the present invention is not limited to any of the example embodiments described above. The present invention can be embodied, based on modification, replacement, and adjustment of each example embodiment.

In addition, the present invention can also be embodied by combining each example embodiment in any way. That is, the present invention encompasses all the disclosure content, and various modifications and alterations which can be realized in accordance with the technical ideas.

The present invention can also be applied to a technical field of software-defined network (SDN).

In addition, in the present invention, software (program) realizing a function of each example embodiment described above may be executed on a computer, a central processing unit (CPU), a micro-processing unit (MPU), or the like in an operation device. A computer, a CPU, an MPU, or the like of an operation device may acquire software (program) realizing a function of each example embodiment described above, via various types of storage media such as a compact disc recordable (CD-R) or networks. A program acquired by an operation device and a storage medium storing therein such a program are deemed to constitute the present invention. Note that the software (program) may be stored in advance in a predetermined storage unit included in the operation device. A computer, a CPU, an MPU, or the like of an operation device may read a program code of the acquired software (program) and execute the program code.

The present application claims a priority based on Japanese Patent Application No. 2016-68774 filed on Mar. 30, 2016, the entire disclosure of which is incorporated herein.

A part or all of the above-described example embodiments may be described as in the following supplementary notes, which are not limiting.

[Supplementary Note 1]

A management node analyzing sensor data collected in a sensor device, the management node characterized by comprising:

an assessment unit that determines whether a first time period required to process the sensor data at a center node within a data center is larger than a prescribed threshold; and a determination unit that determines the sensor data is to be analyzed at the center node when the first time period is equal to or less than the prescribed threshold, wherein when the first time period is larger than the prescribed threshold, the assessment unit determines whether a second time period required to process the sensor data at an edge node positioned at a location near the sensor device is larger than the prescribed threshold, and when the second time period is equal to or less than the prescribed threshold, the determination unit determines that the sensor data is to be analyzed at the edge node.

[Supplementary Note 2]

The management node according to Supplementary Note 1, characterized in that when the second time period is larger than the prescribed threshold, the determination unit determines not to analyze the sensor data.

[Supplementary Note 3]

The management node according to Supplementary Note 1 or 2, characterized in that when the sensor data is determined to be analyzed in the center node or the edge node, the determination unit determines an aggregated number representing a number of a plurality of sensor data to be aggregated.

[Supplementary Note 4]

The management node according to Supplementary Note 3, characterized in that the determination unit determines the aggregated number, based on a throughput representing an efficiency in analyzing a plurality of sensor data and on the prescribed threshold.

[Supplementary Note 5]

The management node according to Supplementary Note 3, characterized in that the determination unit determines the aggregated number, based on a compression ratio representing a ratio with which a plurality of sensor data are compressed and on the prescribed threshold.

[Supplementary Note 6]

The management node according to any one of Supplementary Notes 1 to 5, characterized in that the assessment unit determines the prescribed threshold, based on a property of the sensor data.

[Supplementary Note 7]

A management system analyzing sensor data collected in a sensor device, the management system characterized by comprising:

assessment means for determining whether a first time period required to process the sensor data at a center node within a data center is larger than a prescribed threshold; and determination means for determining the sensor data is to be analyzed at the center node when the first time period is equal to or less than the prescribed threshold, wherein when the first time period is larger than the prescribed threshold, the assessment means determines whether a second time period required to process the sensor data at an edge node positioned at a location near the sensor device is larger than the prescribed threshold, and when the second time period is equal to or less than the prescribed threshold, the determination means determines that the sensor data is to be analyzed at the edge node.

[Supplementary Note 8]

The management system according to Supplementary Note 7, characterized in that when the second time period is larger than the prescribed threshold, the determination means determines not to analyze the sensor data.

[Supplementary Note 9]

The management system according to Supplementary Note 7 or 8, characterized in that when the sensor data is determined to be analyzed in the center node or the edge node, the determination means determines an aggregated number representing a number of a plurality of sensor data to be aggregated.

[Supplementary Note 10]

The management system according to Supplementary Note 9, characterized in that the determination means determines the aggregated number, based on a throughput representing an efficiency in analyzing a plurality of sensor data and on the prescribed threshold.

[Supplementary Note 11]

The management system according to Supplementary Note 9, characterized in that the determination means determines the aggregated number, based on a compression ratio representing a ratio with which a plurality of sensor data are compressed and on the prescribed threshold.

[Supplementary Note 12]

The management system according to any one of Supplementary Notes 7 to 11, characterized in that the assessment means determines the prescribed threshold, based on a property of the sensor data.

[Supplementary Note 13]

A management method analyzing sensor data collected in a sensor device, the management method characterized by comprising:

determining whether a first time period required to process the sensor data at a center node within a data center is larger than a prescribed threshold; and determining the sensor data is to be analyzed at the center node when the first time period is equal to or less than the prescribed threshold, wherein when the first time period is larger than the prescribed threshold, determining whether a second time period required to process the sensor data at an edge node positioned at a location near the sensor device is larger than the prescribed threshold, and when the second time period is equal to or less than the prescribed threshold, determining that the sensor data is to be analyzed at the edge node.

[Supplementary Note 14]

The management method according to Supplementary Note 13, characterized in that when the second time period is larger than the prescribed threshold, determining not to analyze the sensor data.

[Supplementary Note 15]

The management method according to Supplementary Note 13 or 14, characterized in that when the sensor data is determined to be analyzed in the center node or the edge node, determining an aggregated number representing a number of a plurality of sensor data to be aggregated.

[Supplementary Note 16]

The management method according to Supplementary Note 15, characterized in that determining the aggregated number, based on a throughput representing an efficiency in analyzing a plurality of sensor data and on the prescribed threshold.

[Supplementary Note 17]

The management method according to Supplementary Note 15, characterized in that determining the aggregated number, based on a compression ratio representing a ratio with which a plurality of sensor data are compressed and on the prescribed threshold.

[Supplementary Note 18]

The management method according to any one of Supplementary Notes 13 to 17, characterized in that determining the prescribed threshold, based on a property of the sensor data.

[Supplementary Note 19]

A program for analyzing sensor data collected in a sensor device, the program characterized by causing a computer to execute:

a process of determining whether a first time period required to process the sensor data at a center node within a data center is larger than a prescribed threshold; and a process of determining the sensor data is to be analyzed at the center node when the first time period is equal to or less than the prescribed threshold, wherein a process of determining whether a second time period required to process the sensor data at an edge node positioned at a location near the sensor device is larger than the prescribed threshold when the first time period is larger than the prescribed threshold, and a process of determining that the sensor data is to be analyzed at the edge node when the second time period is equal to or less than the prescribed threshold.

[Supplementary Note 20]

The program according to Supplementary Note 19, wherein the program characterized by causing a computer to execute:

a process of determining not to analyze the sensor data when the second time period is larger than the prescribed threshold.

[Supplementary Note 21]

The program according to Supplementary Note 19 or 20, wherein the program characterized by causing a computer to execute:

a process of determining an aggregated number representing a number of a plurality of sensor data to be aggregated when the sensor data is determined to be analyzed in the center node or the edge node.

[Supplementary Note 22]

The program according to Supplementary Note 21, wherein the program characterized by causing a computer to execute:

a process of determining the aggregated number, based on a throughput representing an efficiency in analyzing a plurality of sensor data and on the prescribed threshold.

[Supplementary Note 23]

The program according to Supplementary Note 21, wherein the program characterized by causing a computer to execute:

a process of determining the aggregated number, based on a compression ratio representing a ratio with which a plurality of sensor data are compressed and on the prescribed threshold.

[Supplementary Note 24]

The program according to any one of Supplementary Notes 19 to 23, wherein the program characterized by causing a computer to execute:

a process of determining the prescribed threshold, based on a property of the sensor data.

REFERENCE SIGNS LIST 10 sensor device
20 edge node
21 edge analysis unit
22 data aggregation unit
30 center node
31 center analysis unit
32 data storage unit
40 management node
41 data sampling unit
42 data property analysis unit
43 system configuration calculation unit
44 service performance requirement storage unit
45 system data storage unit
50 sensor data storage unit
100 management system
400 management node
1000 assessment means
1001 determination means

What is claimed is:

1. A management node analyzing sensor data collected in a sensor device, the management node comprising:
a memory storing instructions; and
at least one processor configured to process the instructions to implement:
an assessment unit configured to determines whether a first time period required to process the sensor data at a center node within a data center is larger than a prescribed threshold; and
a determination unit configured to determines the sensor data is to be analyzed at the center node when the first time period is equal to or less than the prescribed threshold, wherein
when the first time period is larger than the prescribed threshold, the assessment unit determines whether a second time period required to process the sensor data at an edge node positioned at a location near the sensor device is larger than the prescribed threshold, and
when the second time period is equal to or less than the prescribed threshold, the determination unit determines that the sensor data is to be analyzed at the edge node.

2. The management node according to claim 1, wherein when the second time period is larger than the prescribed threshold, the determination unit determines not to analyze the sensor data.

3. The management node according to claim 1, wherein when the sensor data is determined to be analyzed in the center node or the edge node, the determination unit determines an aggregated number representing a number of a plurality of sensor data to be aggregated.

4. The management node according to claim 3, wherein the determination unit determines the aggregated number, based on a throughput representing an efficiency in analyzing a plurality of sensor data and on the prescribed threshold.

5. The management node according to claim 3, wherein the determination unit determines the aggregated number, based on a compression ratio representing a ratio with which a plurality of sensor data are compressed and on the prescribed threshold.

6. The management node according to claim 1, wherein the assessment unit determines the prescribed threshold, based on a property of the sensor data.

7. A management method analyzing sensor data collected in a sensor device, the management method characterized by comprising:
determining whether a first time period required to process the sensor data at a center node within a data center is larger than a prescribed threshold; and
determining the sensor data is to be analyzed at the center node when the first time period is equal to or less than the prescribed threshold, wherein
when the first time period is larger than the prescribed threshold, determining whether a second time period required to process the sensor data at an edge node positioned at a location near the sensor device is larger than the prescribed threshold, and
when the second time period is equal to or less than the prescribed threshold, determining that the sensor data is to be analyzed at the edge node.

8. A non-transitory computer readable storage medium storing a program for analyzing sensor data collected in a sensor device, characterized by the program causing a computer to execute:

a process of determining whether a first time period required to process the sensor data at a center node within a data center is larger than a prescribed threshold; and a process of determining the sensor data is to be analyzed at the center node when the first time period is equal to or less than the prescribed threshold, wherein a process of determining whether a second time period required to process the sensor data at an edge node positioned at a location near the sensor device is larger than the prescribed threshold when the first time period is larger than the prescribed threshold, and a process of determining that the sensor data is to be analyzed at the edge node when the second time period is equal to or less than the prescribed threshold.

\* \* \* \* \*